United States Patent
Iwasaki

(10) Patent No.: US 10,671,663 B2
(45) Date of Patent: Jun. 2, 2020

(54) GENERATION DEVICE, GENERATION METHOD, AND NON-TRANSITORY COMPUTER-READABLE RECORDING MEDIUM

(71) Applicant: YAHOO JAPAN CORPORATION, Tokyo (JP)

(72) Inventor: Masajiro Iwasaki, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 382 days.

(21) Appl. No.: 15/810,455

(22) Filed: Nov. 13, 2017

(65) Prior Publication Data
US 2018/0173726 A1    Jun. 21, 2018

(30) Foreign Application Priority Data
Dec. 19, 2016 (JP) .................. 2016-245975

(51) Int. Cl.
*G06F 16/51* (2019.01)
*G06F 16/56* (2019.01)

(52) U.S. Cl.
CPC .............. *G06F 16/56* (2019.01); *G06F 16/51* (2019.01)

(58) Field of Classification Search
CPC ................................. G06F 16/51; G06F 16/56
See application file for complete search history.

(56) References Cited

U.S. PATENT DOCUMENTS

| | | | | |
|---|---|---|---|---|
| 8,428,397 B1* | 4/2013 | Brandt | ................. | G06K 9/6272 |
| | | | | 382/195 |
| 2015/0066957 A1* | 3/2015 | Cevahir | ............ | G06F 16/24578 |
| | | | | 707/749 |
| 2017/0220603 A1* | 8/2017 | Riggs | ..................... | G06Q 40/06 |

FOREIGN PATENT DOCUMENTS

| | | |
|---|---|---|
| JP | 2010-079871 A | 4/2010 |
| JP | 2013-175181 A | 9/2013 |
| JP | 2014-032657 A | 2/2014 |
| JP | 2015-022383 A | 2/2015 |
| JP | 2015-207047 A | 11/2015 |

OTHER PUBLICATIONS

"Equal frequency binning, IBM." <http://www.ibm.com/support/knowledgecenter/SSWLVY_1.0.0/com.ibm.spss.analyticcatalyst.help/analytic_catalyst/equal_frequency_binning.html>, 2016.
Iwasaki, Masajiro. "Proximity Search using Approximate K Nearest Neighbor Graph with a Tree Structured Index". Information Processing Society of Japan, vol. 52, No. 2, pp. 817-828, 2011.
Oct. 31, 2017 Office Action issued in Japanese Patent Application No. 2016-245975.

* cited by examiner

*Primary Examiner* — Jorge A Casanova
(74) *Attorney, Agent, or Firm* — Oliff PLC

(57) ABSTRACT

A generation device according to the subject application includes an acquiring unit and a generating unit. The acquiring unit acquires multiple pieces of vector information that correspond to each search target during the proximity search. The generating unit generates multiple pieces of centroid information, in which each piece of vector information is related in accordance with a distance for vector quantization, based on multiple pieces of vector information acquired by the acquiring unit such that a difference in the number of pieces of vector information related to each piece of centroid information falls within a predetermined value.

16 Claims, 10 Drawing Sheets

| CENTROID ID | VECTOR DATA |
|---|---|
| V1 | 10, 24, 54, 2... |
| ... | ... |
| V6 | 32, 1, 120, 31... |
| ... | ... |

122

| CENTROID ID | RESIDUAL VECTOR INFORMATION |
|---|---|
| ... | ... |
| CN61 | 4, 2, -104, 20... |
| ... | ... |
| CN68 | 88, -3, 20, -65... |
| ... | ... |

LT1

| CENTROID ID | VECTOR ID |
|---|---|
| V1 | V4:CN11, V25:CN15, V32:CN18, V41:CN14, V87:CN19 |
| ... | ... |
| V6 | V9:CN62, V12:CN64, V34:CN61, V54:CN63, V85:CN68 |
| ... | ... |

123A

GENERATION DEVICE, GENERATION METHOD, AND NON-TRANSITORY COMPUTER-READABLE RECORDING MEDIUM

CROSS-REFERENCE TO RELATED APPLICATION(S)

The present application claims priority to and incorporates by reference the entire contents of Japanese Patent Application No. 2016-245975 filed in Japan on Dec. 19, 2016.

BACKGROUND OF THE INVENTION

1. Field of the Invention

The present invention relates to a generation device, a generation method, and a non-transitory computer-readable recording medium.

2. Description of the Related Art

Conventional technologies are disclosed with regard to search for vector data due to vector quantization. For example, there is a disclosed technology for quantization of vectors by using a code book. Furthermore, this kind of technology is used for, for example, image search.

CITED REFERENCES

[Patent Literature 1] Japanese Laid-open Patent Publication No. 2013-175181
[Non Patent Literature 1] Equal frequency binning, IBM, [online], [Searched on Dec. 8, 2016], the Internet <URL: http://www.ibm.com/support/knowledgecenter/SS-WLVY_1.0.0/com.ibm.spss.analyticcatalyst.help/analytic_catalyst/equal_frequency_binning.html>]
[Non Patent Literature 2] Masajiro Iwasaki, "Proximity search using Approximate K Nearest Neighbor Graph with a Tree Structured Index", papers by Information Processing Society of Japan, 2011/2, Vol. 52, No. 2. pp. 817-828.

However, according to the above-described conventional technologies, it is sometimes difficult to generate the centroid information that enables efficient searching during the proximity search. For example, if vectors are only quantized by using a code book, there is an increase in the processing time required to search for centroids in accordance with an increase in the number of centroids, and it is difficult to reduce the processing time for search. In such a case, it is sometimes difficult to efficiently conduct searching in response to queries.

SUMMARY OF THE INVENTION

It is an object of the present invention to at least partially solve the problems in the conventional technology.

According to one aspect of an embodiment, a generation device includes an acquiring unit that acquires multiple pieces of vector information that correspond to each search target during proximity search, and a generating unit that generates multiple pieces of centroid information, in which each piece of vector information is related in accordance with a distance for vector quantization, based on multiple pieces of vector information, acquired by the acquiring unit, such that a difference in a number of pieces of vector information related to each piece of centroid information falls within a predetermined value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
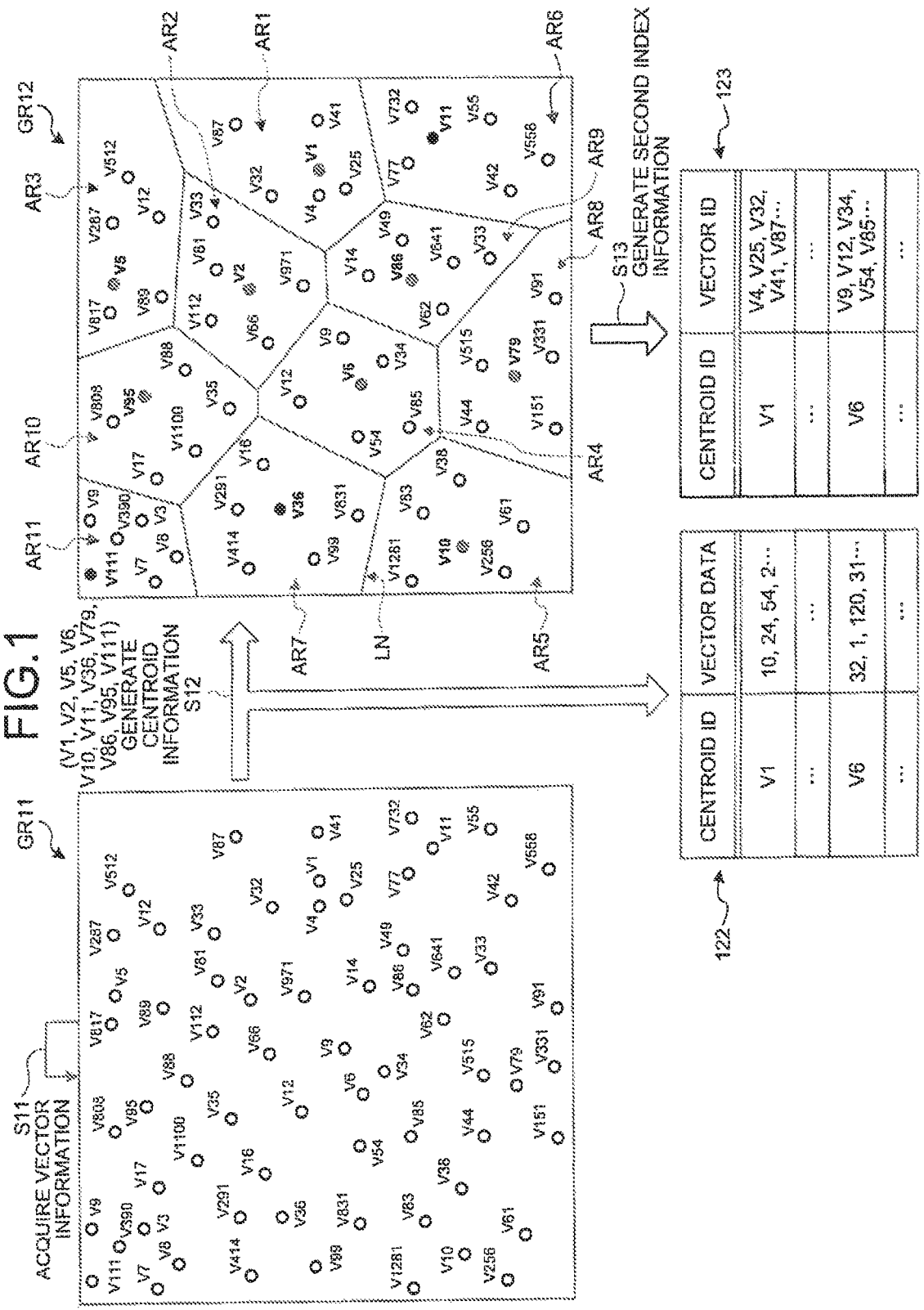
FIG. 1 is a diagram that illustrates an example of a generation process according to an embodiment.

With reference to the drawings, a detailed explanation is given below of aspects (hereafter, referred to as "embodiments") for implementing a generation device, a generation method, and a generation program according to the subject application. Furthermore, the generation device, the generation method, and the generation program according to the subject application are not limited to the embodiments. Furthermore, in each of the following embodiments, the same part is attached with the same reference numeral, and duplicated explanations are omitted.

EMBODIMENT

1. Generation Process

By using FIG. 1, an example of the generation process according to an embodiment is explained. FIG. 1 is a diagram that illustrates an example of the generation process according to the embodiment. FIG. 1 illustrates a case where pieces of centroid information are generated with regard to multiple pieces of vector information that are given to a generation device 100 (see FIG. 3). Here, the target information may be any information as long as it can be represented as a vector. Furthermore, an explanation is given below of the vector information targeted for image information; however, the vector information may be targeted for other objects, such as moving image information or sound information.

In the example of FIG. 1, the targets are pieces of vector information that correspond to pieces of image information in units of several millions to several hundreds of millions; however, in the drawings, only part of them is illustrated. Furthermore, the example of FIG. 1 illustrates a case where centroids are selected from vectors and pieces of centroid information are generated. Furthermore, hereafter, "vector data" is described if the vector data that corresponds to image information is mentioned, and "vector identification information" is described if the information for identifying each piece of vector data that corresponds to image information is mentioned. Specifically, the vector data mentioned here refers to a high-dimensional vector in N dimensions, and the vector identification information refers to the information for identifying each vector, such as a vector ID. For example, in the example illustrated in FIG. 1, if vector identification information V11 is described, it refers to the vector ID "V11". Moreover, "vector" or "vector information" is described if an explanation is given without any particular distinction between vector data and vector identification information.

Furthermore, if "vector V* (* is any number)" is described below, it is indicated that the vector is the vector that is identified with the vector ID "V*". For example, if "vector V1" is described, the vector is a vector that is identified with the vector ID "V1". Furthermore, if "centroid V* (* is any number)" is described, it is indicated that the centroid is the centroid that is identified with the centroid ID "V*". For example, if "centroid V6" is described, the centroid is the centroid (vector) that is identified with the centroid ID "V6".

First, as illustrated in FIG. 1, the generation device 100 acquires pieces of vector information that correspond to respective pieces of image information (Step S11). In the example of FIG. 1, the generation device 100 acquires multiple pieces of vector information that are identified with respective pieces of vector identification information V1 to V1100, or the like, as illustrated in spatial information GR11, or the like. For example, the generation device 100 acquires a large number of pieces of vector information that include the pieces of vector identification information V1 to V1100, or the like.

In the example illustrated in FIG. 1, each piece of acquired vector information is represented by attaching "o" with vector identification information. For example, the vector identified with the vector ID "V111" is represented as the "o" point on the upper left of the spatial information GR11. For example, in the example illustrated in FIG. 1, each piece of vector data is a real-valued vector in N dimensions.

Furthermore, the spatial information GR11 or spatial information GR12 in FIG. 1 may be Euclidean space. Furthermore, the pieces of spatial information GR11, GR12 illustrated in FIG. 1 are conceptual diagrams for illustrating the distance between vectors, or the like. They are multidimensional spaces. Furthermore, for example, the spatial information GR11, illustrated in FIG. 1, is illustrated in a two-dimensional form as it is illustrated on a plane; however, it is a multidimensional space in 100 dimensions, 1000 dimensions, or the like.

According to the present embodiment, the distance between vectors in the pieces of spatial information GR11, GR12 is the similarity measure (degree of similarity) between corresponding images. Here, in the example illustrated in FIG. 1, images have a high similarity measure if the distance between vectors is small in the pieces of spatial information GR11, GR12, and images have a low similarity measure if the distance between vectors is large in the pieces of spatial information GR11, GR12. For example, in the pieces of spatial information GR11, GR12 in FIG. 1, the vector information identified with the vector ID "V6" and the vector information identified with vector ID "V34" are located close to each other, that is, the distance is small. Therefore, it is indicated that the image that corresponds to the vector information identified with the vector ID "V6" and the image that corresponds to the vector information identified with the vector ID "V34" have a high similarity measure. Moreover, for example, in the pieces of spatial information GR11, GR12 in FIG. 1, the vector information identified with the vector ID "V6" and the vector information identified with the vector ID "V111" are located apart from each other, that is, the distance is large. Therefore, it is indicated that the image that corresponds to the vector information identified with the vector ID "V6" and the image that corresponds to the vector information identified with the vector ID "V111" have a low similarity measure.

Then, the generation device 100 generates centroid information (Step S12). In the example of FIG. 1, the generation device 100 generates pieces of centroid information by selecting vectors, which serves as centroids, from multiple vectors that are identified with the respective pieces of vector identification information V1 to V1100, or the like. Furthermore, in some cases, the vector selected as a centroid is referred to "centroid" below.

Here, in the example of FIG. 1, in accordance with the position from the vectors selected as centroids, the generation device 100 relates each vector with any of the centroids. For example, the generation device 100 conducts clustering on each vector other than the vectors selected as centroids in accordance with the distance from each of the centroids. For example, the generation device 100 classifies each vector into a cluster that corresponds to the centroid with the shortest distance.

Conceptually, for example, as illustrated in the spatial information GR12 in FIG. 1, the generation device 100 sets each centroid as a seed and divides areas depending on whether other points are close to any of the seeds. In the example of FIG. 1, the generation device 100 divides the spatial information GR12 into areas AR1 to AR11 by using a boundary LN. For example, the area AR1 in the spatial information GR12 of FIG. 1 includes the vector (centroid) identified with the vector identification information V1, the vectors identified with the respective pieces of vector identification information V4, V25, V32, V41, and V87, and the like. In the example of FIG. 1, it is indicated that the vectors identified with the respective pieces of vector identification information V4, V25, V32, V41, and V87 are located closest to the centroid identified with the vector identification information V1. For example, it is indicated that the images that correspond to the vectors identified with the respective pieces of vector identification information V4, V25, V32, V41, and V87 are similar to the image that corresponds to the centroid identified with the vector identification information V1 among the centroids. In this case, the generation device 100 relates the pieces of vector identification information V4, V25, V32, V41, and V87 to the centroid identified with the vector identification information V1, which is the centroid ID.

Here, the generation device 100 generates multiple pieces of centroid information such that a difference in the number of vectors related to each centroid falls within a predetermined value. For example, the generation device 100 generates multiple pieces of centroid information such that the number of vectors related to each centroid is equal. Hereinafter, in order to explain this aspect, the number of vectors included in the pieces of spatial information GR11, GR12 is a small number, 1100, and 11 centroids are generated. Furthermore, as described above, the number of vectors may be in units of hundreds of millions. Furthermore, the number of centroids may be selected (determined) in accordance with the number of vectors, or it may be selected (determined) in accordance with a predetermined set value.

For example, the generation device 100 conducts random sampling, thereby generating multiple pieces of centroid information such that a difference in the number of pieces of vector identification information falls within a predetermined value. For example, the generation device 100 conducts random sampling to select centroids and clusters each vector in accordance with the selected centroids, thereby generating multiple pieces of centroid information such that a difference in the number of vectors related to each centroid falls within a predetermined value. As described above, if the number of vectors included in the spatial information GR12 is 1100 and the number of generated centroids is 11, multiple pieces of centroid information are generated such that the number of vectors related to each centroid is 99.

For example, the generation device 100 conducts random sampling a predetermined number of times and generates multiple pieces of centroid information with regard to the combination of centroids, with which vectors are clustered such that a difference in the number of vectors included in each cluster is smallest. For example, the generation device 100 conducts random sampling a predetermined number of times and generates multiple pieces of centroid information with regard to the combination of centroids, with which vectors are clustered most equally. Furthermore, for example, the generation device 100 may change the centroid, which largely deviates from an average value, in the combination of centroids, with which vectors are clustered most equally, to a different neighboring vector, thereby generating multiple pieces of centroid information such that the number of vectors related to each centroid is equal. Furthermore, for example, the generation device 100 may terminate random sampling if a difference in the number of vectors included in each cluster is equal to or less than a predetermined value (e.g., 5 or 10) and generate multiple pieces of centroid information in accordance with the combination of centroids. For example, the generation device 100 may terminate random sampling if the difference between the cluster that includes a largest number of vectors and the cluster that includes a smallest number of vectors is equal to or less than a predetermined value (e.g., 1 or 50) and generate multiple pieces of centroid information in accordance with the combination of centroids. Moreover, for example, the generation device 100 may terminate random sampling if the difference in the number of vectors included in each cluster is "0", that is, if the number of vectors included in each cluster is the same, and generate multiple pieces of centroid information in accordance with the combination of centroids.

Furthermore, the foregoing is an example, and the generation device 100 may use any information or technology to generate multiple pieces of centroid information as long as the pieces of centroid information can be generated such that a difference in the number of vectors related to each centroid falls within a predetermined value. For example, the generation device 100 may use or combine various conventional technologies, or the like, as appropriate to generate multiple pieces of centroid information such that the number of vectors related to each centroid is equal. For example, the generation device 100 may use the technology of equal frequency binning, disclosed in Non Patent literature 1, to generate multiple pieces of centroid information such that the number of vectors related to each centroid is equal.

In the example of FIG. 1, as illustrated in the spatial information GR12 of FIG. 1, the generation device 100 generates the pieces of centroid information in which the pieces of vector identification information V1, V2, V5, V6, V10, V11, V36, V79, V86, V95, and V111 are centroids. Although FIG. 1 illustrates 5 vectors in each of the areas AR1 to AR11 that correspond to the respective centroids, it is assumed that 99 vectors are located in each of the areas AR1 to AR11. In this way, the generation device 100 may generate multiple pieces of centroid information such that the vectors related to each of the pieces of vector identification information V1, V2, V5, V6, V10, V11, V36, V79, V86, V95, and V111, which are centroids, are equal. For example, if the number of vectors assigned to a centroid is large, a vector that is not in the neighborhood is a result and, if it is small, it is difficult to search the neighborhood. Therefore, the performance is improved if the appropriate number of vectors is equal. Especially, in the case of k-nearest proximity search (k-nearest neighbor search), the number of search results is constant, and therefore equalization is effective.

For example, the generation device 100 generates multiple pieces of centroid information that are illustrated in a centroid-information storage unit 122. For example, the generation device 100 sets the vector identification information V1 for identifying the centroid that corresponds to the area AR1 in the spatial information GR12 as a centroid ID and stores the vector information identified with the vector identification information V1 as centroid information in the centroid-information storage unit 122. Specifically, the generation device 100 sets the vector identification information V1 for identifying the centroid that corresponds to the area AR1 in the spatial information GR12 as a centroid ID, generates centroid information, in which the vector information identified with the vector identification information V1 is combined, and stores it in the centroid-information storage unit 122. For example, the generation device 100 stores the vector data "10, 24, 54, 2 . . . " on the vector (vector V1) identified with the vector identification information V1 in the centroid-information storage unit 122.

For example, the generation device 100 sets the vector identification information V6 for identifying the centroid that corresponds to the area AR4 in the spatial information GR12 as a centroid ID and stores the vector information identified with the vector identification information V6 as centroid information in the centroid-information storage unit 122. Specifically, the generation device 100 generates the centroid information in which the centroid ID "V6" is combined with the vector data identified with the vector identification information V6, i.e., the N-dimensional vector information "32, 1, 120, 31 . . . ", and stores it in the centroid-information storage unit 122.

Then, the generation device 100 generates second index information on the basis of vectors related to each centroid (Step S13). For example, the generation device 100 generates the second index information in which the centroid ID is related to the information for identifying vectors included in each of the areas AR1 to AR11 that correspond to the respective centroids. For example, the generation device 100 stores the pieces of vector identification information V4, V25, V32, V41, and V87 in relation to the centroid ID "V1" in a second-index information storage unit 123. In this way, the generation device 100 generates what is called inverted index information in which a centroid is related to the information for identifying a vector, whereby there may be an increase in the speed of searching for a similar vector if a centroid is identified. Furthermore, multiple centroids in the neighborhood may be identified during searching for similar vectors.

As described above, the generation device 100 generates multiple centroids such that a difference in the number of vectors related to each centroid falls within a predetermined value and generates multiple centroids such that the number of vectors related to each centroid is equal, thereby generating the centroid information that enables efficient searching during the proximity search. For example, the centroid that corresponds to a query may be identified on the basis of the centroid information generated by the generation device 100 and therefore the vector related to the centroid may be obtained as a search result, whereby efficient searching is possible during the proximity search. Furthermore, the generation device 100 performs information generation processes other than the above-described process or provides information in response to a query by using generated information; those aspects are described later in detail.

Furthermore, as described above, the generation device 100 stores only the vector data on centroids, included in the entire vector data, in a storage unit 120 (see FIG. 3), such as the centroid-information storage unit 122, and does not store other sets of vector data in the storage unit 120. In other words, with regard to vectors other than centroids, the generation device 100 stores only the vector identification information in the second-index information storage unit 123. This allows the generation device 100 to generate the centroid information that enables efficient searching during the proximity search while the amount of data for the vector information to be stored is reduced.

1-1. First Index

Furthermore, the generation device 100 generates first index information that is used to identify a corresponding centroid when a query is acquired. For example, as the first index information, the generation device 100 generates a search index for searching a high-dimensional vector. The high-dimensional vector mentioned here may be, for example, a vector in a few hundred dimensions to a few thousand dimensions or may be a vector in more dimensions.

Furthermore, for example, as the first index information, the generation device 100 may generate the information about a graph-type search index, disclosed in Non Patent Literature 2. Moreover, for example, as the first index information, the generation device 100 may generate a search index related to a tree structure. For example, the generation device 100 may generate a search index related to a k-dimensional tree (kd-tree) as the first index information. For example, the generation device 100 may generate a search index related to a vantage-point tree (VP tree) as the first index information. In this way, the generation device 100 may generate a tree structured index (tree-based index) or a graph-structure type index with regard to multiple pieces of centroid information as the first index information.

Moreover, for example, the generation device 100 may generate an inverted index as the first index information.

Figure 11:
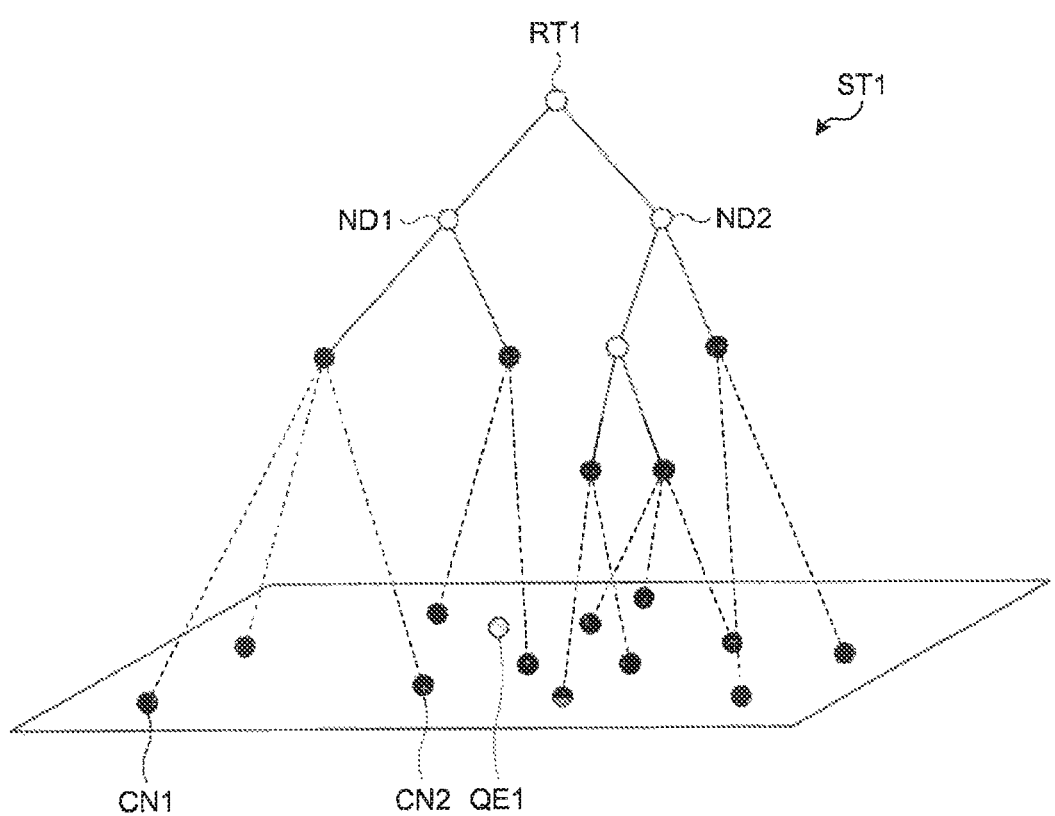
FIG. 11 is a diagram that illustrates a conceptual diagram of the first index information according to the embodiment.

Furthermore, for example, the generation device 100 may generate first index information ST1 that has a different tree structure that is illustrated in FIG. 11. FIG. 11 is a diagram that illustrates a conceptual diagram of the first index information according to the embodiment. For example, the generation device 100 may store the first index information, which is conceptually illustrated in FIG. 11, in a first-index information storage unit 121. Furthermore, for example, as the first index information, the generation device 100 may use other indexes of the hash type, or the like, which enables searching of high-dimensional data. For example, as the first index information, the generation device 100 may store other indexes of the hash type, or the like, which enables searching of high-dimensional data, in the first-index information storage unit 121.

The first index information ST1 in FIG. 11 includes a route RT1, nodes ND1, ND2, centroids CN1, CN2, and the like. In the example of FIG. 1, for example, the centroids CN1 and CN2 may be the vector V36 and the vector V111. Furthermore, FIG. 11 illustrates a search query QE1 that is information other than the first index information ST1, and for example the generation device 100 identifies a centroid that is closest to the search query QE1 by using the first index information ST1. For example, the generation device 100 may follow the first index information ST1 from the top to the bottom (e.g., from the route RT1 to a centroid) to identify a centroid that is a neighboring candidate of the search query QE1.

Furthermore, the above-described tree-structure or graph type search indexes with regard to multiple pieces of centroid information are examples, and the generation device 100 may generate first index information with any data structure as long as the centroid information that corresponds to a query may be identified at a high speed. For example, the generation device 100 may generate the first index information by using various conventional technologies, such as a technology related to binary space partitioning, as appropriate as long as the centroid information that corresponds to a query may be identified at a high speed. For example, the generation device 100 may generate the first index information with any data structure as long as searching for high-dimensional vectors may be handled with the index.

1-2. Dynamic Generation

Furthermore, the above-described example describes a case where the vector information is acquired; however, the generation device 100 may perform the above-described process if pieces of vector information are sequentially acquired. For example, if the number of pieces of centroid information is less than a predetermined threshold when vector information is acquired, the generation device 100 selects the vector information as centroid information, thereby generating multiple pieces of centroid information. Due to this process, the generation device 100 may generate the centroid information that enables efficient searching during the proximity search.

For example, as the generation device 100 sequentially sets the acquired vector as a centroid as described above until the number of centroids reaches a predetermined threshold, centroids may be selected in the same manner as random sampling. For example, in many application forms, the order of input data is often random, and it often causes the same result as random sampling. For instance, if the number of centroids is set to one hundred thousand, the generation device 100 sequentially sets the added vector as a centroid until the total number of vectors reaches one hundred thousand. In this case, as the generation device 100 sets all the added vectors as centroids until the number of vectors reaches one hundred thousand, a centroid (vector) may be identified on the basis of the above-described first index information when a query is acquired. Furthermore, if the number of vectors exceeds one hundred thousand, the generation device 100 relates the added vector to any of the centroids; therefore, if a query is acquired, a vector may be identified on the basis of the above-described second index information after the centroid is identified.

2. Configuration of the Generation System

Figure 2:
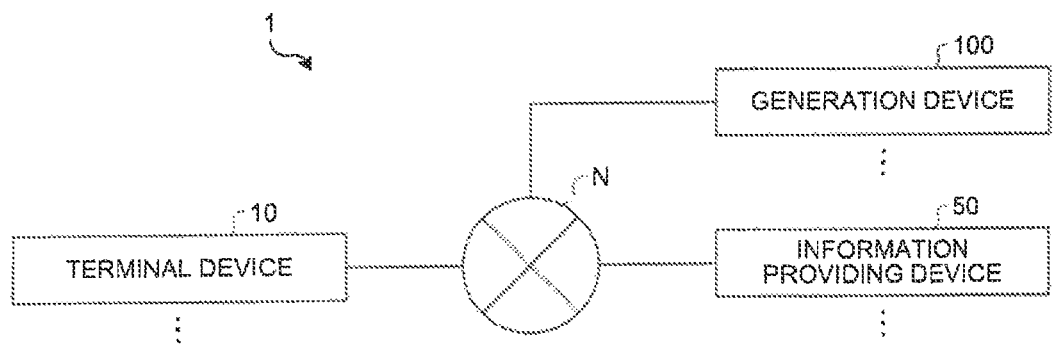
FIG. 2 is a diagram that illustrates an example of the configuration of a generation system according to the embodiment.

As illustrated in FIG. 2, a generation system 1 includes a terminal device 10, an information providing device 50, and the generation device 100. The terminal device 10, the information providing device 50, and the generation device 100 are connected via a predetermined network N such that they can communicate wired or wirelessly. FIG. 2 is a diagram that illustrates an example of the configuration of the generation system according to the embodiment. Furthermore, the generation system 1 illustrated in FIG. 2 may include the multiple terminal devices 10, the multiple information providing devices 50, or the multiple generation devices 100.

The terminal device 10 is an information processing device used by users. The terminal device 10 receives various user's operations. Furthermore, hereafter, the terminal device 10 is sometimes referred to as a user. That is, hereafter, the user may be read as the terminal device 10. Moreover, the above-described terminal device 10 is implemented by using, for example, a smartphone, tablet-type terminal, notebook personal computer (PC), desktop PC, mobile phone, or Personal Digital Assistant (PDA). The example illustrated in FIG. 7 describes a case where the terminal device 10 is a notebook PC.

The information providing device 50 is an information processing device that stores information for providing various types of information to users, or the like. For example, the information providing device 50 stores pieces of vector identification information based on pieces of textual information, or the like, collected from various external devices, such as a web server. For instance, the information providing device 50 is an information processing device that provides users, or the like, with an image search service. For example, the information providing device 50 stores various types of information for providing the image search service. For instance, the information providing device 50 provides the generation device 100 with the vector information that corresponds to the image targeted for the image search service. Furthermore, the information providing device 50 transmits a query to the generation device 100 so as to receive the vector identification information, or the like, which indicates the image that corresponds to the query from the generation device 100.

The generation device 100 generates multiple pieces of centroid information, in which each piece of vector information is related in accordance with a distance for vector quantization, based on multiple pieces of vector information such that a difference in the number of pieces of vector information related to each piece of centroid information falls within a predetermined value. For example, the generation device 100 generates multiple pieces of centroid information such that the number of pieces of vector information related to each piece of centroid information is equal. Furthermore, according to the present embodiment, if a query is acquired, the generation device 100 provides the vector identification information that corresponds to the query on the basis of the generated information. Moreover, the generation device 100 may generate centroid information on the basis of the vector information collected from various external devices such as the information providing device 50.

3. Configuration of the Generation Device

Figure 3:
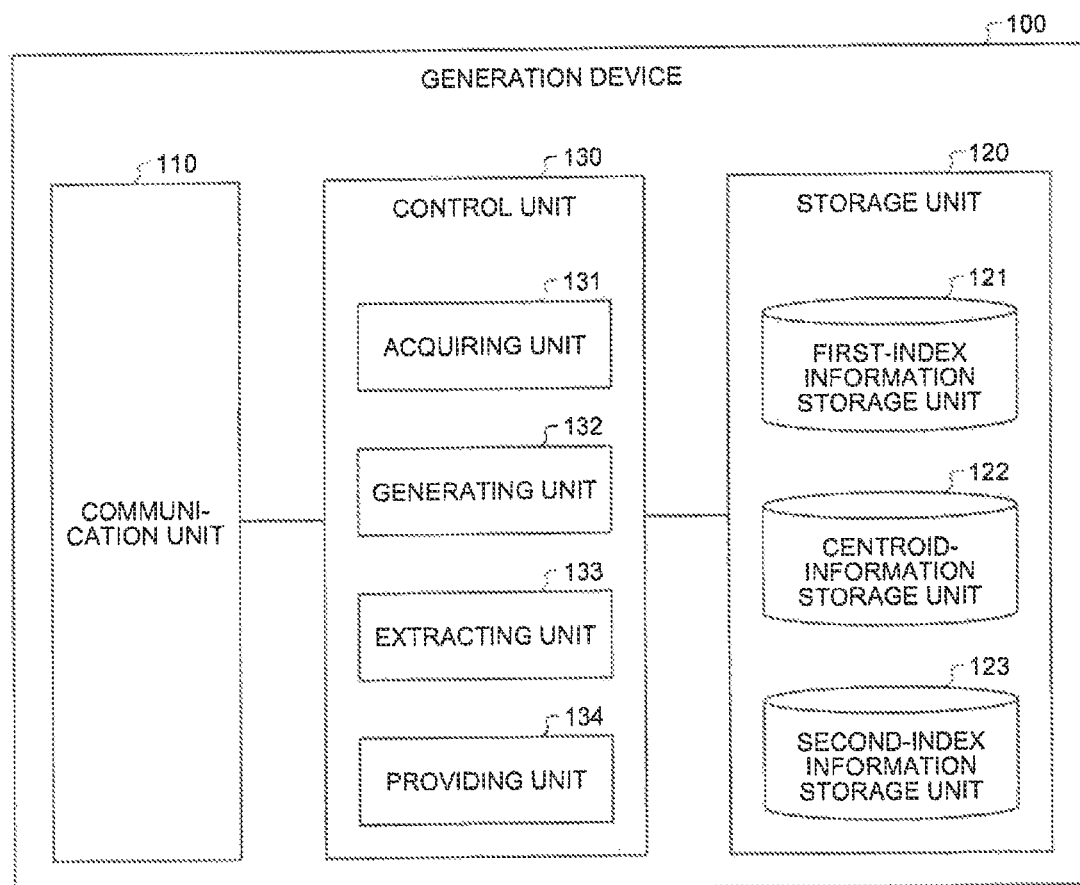
FIG. 3 is a diagram that illustrates an example of the configuration of a generation device according to the embodiment.

Next, by using FIG. 3, the configuration of the generation device 100 according to the embodiment is explained. FIG. 3 is a diagram that illustrates an example of the configuration of the generation device 100 according to the embodiment. As illustrated in FIG. 3, the generation device 100 includes a communication unit 110, the storage unit 120, and a control unit 130. Furthermore, the generation device 100 may include an input unit (e.g., a keyboard or a mouse), which receives various operations from an administrator, or the like, of the generation device 100, or a display unit (e.g., a liquid crystal display) that displays various types of information.

The Communication Unit 110

The communication unit 110 is implemented by using, for example, a network interface card (NIC). Furthermore, the communication unit 110 is connected to a network (e.g., the network N in FIG. 2) wired or wirelessly so that it transmits and receives information to and from the terminal device 10.

The Storage Unit 120

The storage unit 120 is implemented by using a semiconductor memory device, such as a random access memory (RAM) or a flash memory, or a storage device, such as a hard disk or an optical disk. As illustrated in FIG. 3, the storage unit 120 according to the embodiment includes the first-index information storage unit 121, the centroid-information storage unit 122, and the second-index information storage unit 123. Furthermore, although the illustration is omitted, the first-index information storage unit 121 stores various types of information related to the above-described first index.

The Centroid-Information Storage Unit 122

Figure 4:
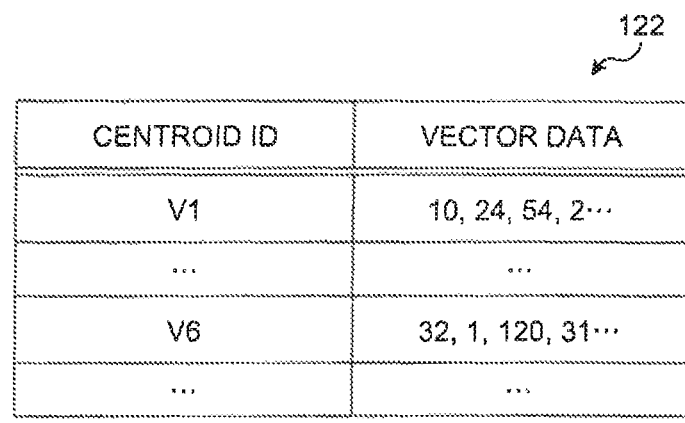
FIG. 4 is a diagram that illustrates an example of a centroid-information storage unit according to the embodiment.

The centroid-information storage unit 122 according to the embodiment stores various types of information related to centroids. For example, the centroid-information storage unit 122 stores centroid IDs and vector data. FIG. 4 is a diagram that illustrates an example of the centroid-information storage unit according to the embodiment. The centroid-information storage unit 122, illustrated in FIG. 4, includes the items of "centroid ID" and "vector data".

The "centroid ID" indicates the identification information for identifying a centroid. Furthermore, the "vector data" indicates the vector data that corresponds to the centroid (vector) identified with the centroid ID.

For example, the example illustrated in FIG. 4 illustrates that, in the centroid-information storage unit 122, the vector data that corresponds to the centroid (vector) identified with the centroid ID "V1" is N-dimensional vector "10, 24, 54, 2 . . . ".

Moreover, for example, the example illustrated in FIG. 4 illustrates that, in the centroid-information storage unit 122, the vector data that corresponds to the centroid (vector) identified with the centroid ID "V6" is N-dimensional vector "32, 1, 120, 31 . . . ".

Furthermore, in addition to the foregoing, the centroid-information storage unit 122 may store various types of information in accordance with purposes.

The Second-Index Information Storage Unit 123

Figure 5:
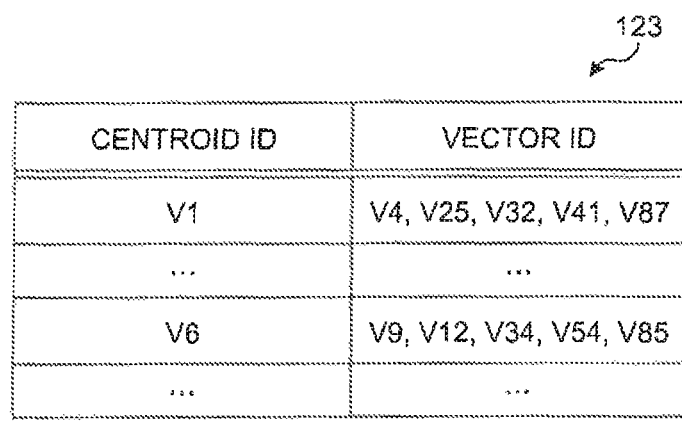
FIG. 5 is a diagram that illustrates an example of a second-index information storage unit according to the embodiment.

The second-index information storage unit 123 according to the embodiment stores various types of information for identifying a vector related to each centroid stored in the centroid-information storage unit 122. FIG. 5 is a diagram that illustrates an example of the second-index information storage unit according to the embodiment. In the example of FIG. 5, the second-index information storage unit 123 includes the items of "centroid ID" and "vector ID".

The "centroid ID" indicates the identification information for identifying a centroid. Furthermore, the "vector ID" indicates a vector that is related to the centroid (vector) identified with the centroid ID.

For instance, the example illustrated in FIG. 5 indicates that, in the second-index information storage unit 123, the vectors related to the centroid (vector) identified with the centroid ID "V1" are vectors that are identified with the respective pieces of vector identification information V4, V25, V32, V41, V87, or the like.

Furthermore, for instance, the example illustrated in FIG. 5 indicates that, in the second-index information storage unit 123, the vectors related to the centroid (vector) identified with the centroid ID "V6" are vectors that are identified with the respective pieces of vector identification information V9, V12, V34, V54, V85, or the like.

Furthermore, in addition to the foregoing, the second-index information storage unit 123 may store various types of information in accordance with purposes.

The Control Unit 130

With reference back to FIG. 3, the control unit 130 is a controller, and it is implemented when, for example, a central processing unit (CPU), a micro processing unit (MPU), or the like, executes various programs (equivalence of an example of the generation program) stored in an internal storage device of the generation device 100 by using a RAM as a work area. Furthermore, the control unit 130 is a controller, and it is implemented by using an integrated circuit, such as an application specific integrated circuit (ASIC) or a field programmable gate array (FPGA).

As illustrated in FIG. 3, the control unit 130 includes an acquiring unit 131, a generating unit 132, an extracting unit 133, and a providing unit 134, and it implements or executes information processing functions and operations that are described below. Furthermore, the internal configuration of the control unit 130 is not limited to the configuration illustrated in FIG. 3, and it may be a different configuration as long as the information processing described below is conducted with the configuration.

The Acquiring Unit 131

The acquiring unit 131 acquires various types of information. For example, the acquiring unit 131 acquires various types of information from the centroid-information storage unit 122, the second-index information storage unit 123, or the like. Furthermore, the acquiring unit 131 acquires various types of information from an external information processing device.

For example, the acquiring unit 131 acquires multiple pieces of vector identification information that correspond to each search target. For instance, the acquiring unit 131 may acquire information related to each piece of vector identification information from the information providing device 50. For example, the acquiring unit 131 may acquire multiple pieces of vector identification information at different timings. For instance, the acquiring unit 131 may acquire the vector identification information that corresponds to image information when the image information is added as a search target.

Figure 7:
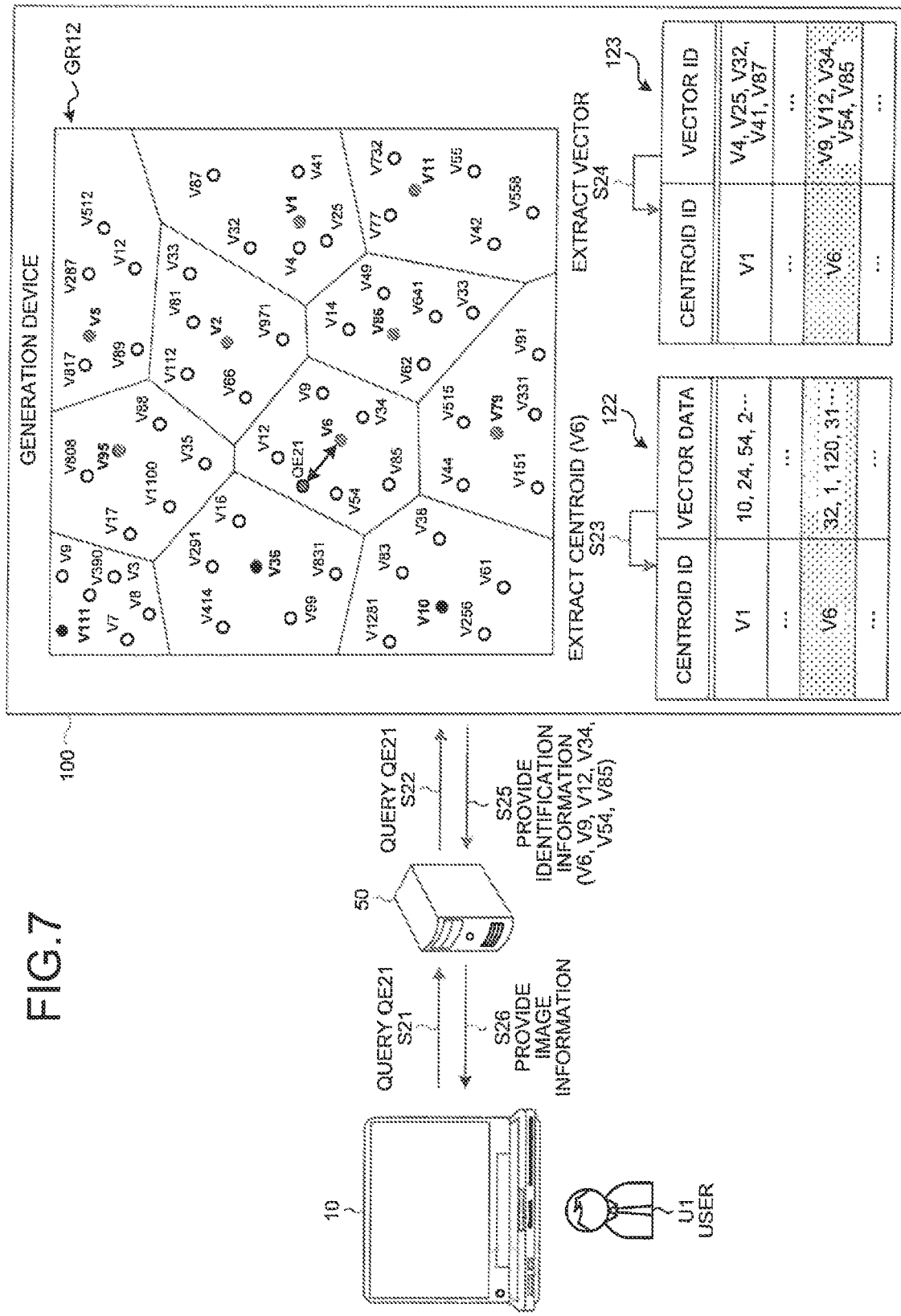
FIG. 7 is a diagram that illustrates an example of provision of information that corresponds to a query according to the embodiment.

For example, the acquiring unit 131 acquires the information related to a search query. For instance, the acquiring unit 131 acquires a search query with regard to image searching. In the example of FIG. 7, the acquiring unit 131 acquires a query from the information providing device 50 that has received the query from the terminal device 10 used by a user U1.

In the example of FIG. 1, the acquiring unit 131 acquires the vector information that corresponds to each piece of image information. In the example of FIG. 1, the acquiring unit 131 acquires multiple pieces of vector information identified with the respective pieces of vector identification information V1 to V1100, or the like, illustrated in the spatial information GR11, or the like. For example, the acquiring unit 131 acquires a large number of pieces of vector information that include the pieces of vector identification information V1 to V1100, and the like.

The Generating Unit 132

The generating unit 132 generates various types of information. For example, the generating unit 132 generates multiple pieces of centroid information, in which each piece of vector information is related in accordance with a distance for vector quantization, based on multiple pieces of vector information such that the number of pieces of vector information related to each piece of centroid information is equal. For example, the generating unit 132 selects vector information as centroid information from multiple pieces of vector information in accordance with a predetermined condition, thereby generating multiple pieces of centroid information. For instance, as centroid information, the generating unit 132 selects vector information, which is selected during random sampling, from multiple pieces of vector information, thereby generating multiple pieces of centroid information.

For example, if the number of pieces of centroid information is less than a predetermined threshold when the acquiring unit 131 acquires vector information, the generating unit 132 selects the vector information as centroid information, thereby generating multiple pieces of centroid information. For instance, if the number of pieces of centroid information is less than a predetermined threshold when vector information is acquired, the generating unit 132 selects the vector information as centroid information, thereby generating multiple pieces of centroid information.

For example, the generating unit 132 generates the first index information, which is used to identify centroid information, in response to a predetermined search request. For instance, as the first index information, the generating unit 132 generates the search index for searching for high-dimensional vectors. For example, as the first index information, the generating unit 132 generates a tree structured index or a graph-structure type index with regard to multiple pieces of centroid information.

For example, the generating unit 132 generates the second index information that indicates each piece of centroid information and the vector information that is related to the piece of centroid information. For instance, as the second index information, the generating unit 132 generates an inverted index for identifying the vector information related to each piece of centroid information.

For example, based on vector quantization for quantizing each partial vector, which is divided from each piece of vector information, the generating unit 132 generates multiple pieces of centroid information such that the number of pieces of vector information related to each piece of centroid information is equal. For example, on the basis of the vector information included in the area that corresponds to each piece of centroid information, the generating unit 132 generates pieces of partial centroid information that corresponds to partial areas, which are divided from the area. For example, on the basis of the residual vector information with regard to the vector information included in the area that corresponds to each piece of centroid information, the generating unit 132 generates pieces of partial centroid information that correspond to partial areas, which are divided from the area. For example, on the basis of the residual vector information that is generated from each piece of centroid information and the vector information included in the area that corresponds to the piece of centroid information, the generating unit 132 generates pieces of partial centroid information that correspond to partial areas that are divided from the area. For example, the generating unit 132 generates the relation information, in which the partial centroid information on each partial area is related to the vector information included in the partial area. For example, the generating unit 132 generates relation information on the basis of the residual vector information that is generated from each piece of centroid information and each piece of partial centroid information that corresponds to each partial area with regard to the piece of centroid information.

In the example of FIG. 1, the generating unit 132 conducts random sampling a predetermined number of times and generates multiple pieces of centroid information in accordance with the combination of centroids, with which vectors are clustered most equally. Furthermore, for example, the generating unit 132 may change the centroid, which largely deviates from the average value, in the combination of centroids, with which vectors are clustered most equally, to a different neighboring vector, thereby generating multiple pieces of centroid information such that the number of vectors related to each centroid is equal.

In the example of FIG. 1, as illustrated in the spatial information GR12 of FIG. 1, the generating unit 132 generates the centroid information where the pieces of vector identification information V1, V2, V5, V6, V10, V11, V36, V79, V86, V95, and V111 are centroids. For example, the generating unit 132 generates multiple pieces of centroid information that are illustrated in the centroid-information storage unit 122.

In the example of FIG. 1, the generating unit 132 generates the second index information based on the vectors related to each centroid. For example, the generating unit 132 generates the second index information, in which the information for identifying a vector included in each of the areas AR1 to AR11 that correspond to the respective centroids is related to a centroid ID. Furthermore, the generating unit 132 generates the first index information that is used to identify a corresponding centroid when a query is acquired.

The Extracting Unit 133

The extracting unit 133 selects various types of information. For example, the extracting unit 133 selects vector identification information. For instance, the extracting unit 133 selects the centroid information on the basis of the query acquired by the acquiring unit 131.

In the example of FIG. 7, the extracting unit 133 extracts centroids by using query information QE21. For example, the extracting unit 133 identifies and extracts the centroid that corresponds to the query information QE21 on the basis of the first index information stored in the first-index information storage unit 121. For example, the extracting unit 133 uses various conventional technologies as appropriate to identify a feature area in the query information QE21 and calculates the feature value in the feature area as a local feature value. For example, the extracting unit 133 uses various conventional technologies as appropriate to extract a local feature value in the query information QE21.

In the example of FIG. 7, the extracting unit 133 extracts the centroid information identified with the centroid ID "V6" from the centroid-information storage unit 122. For example, the extracting unit 133 extracts the centroid information identified with the centroid ID "V6" as the query information QE21 is closest to the centroid identified with the centroid ID "V6" among the centroids in the spatial information GR12. For example, the extracting unit 133 extracts a vector on the basis of the centroid information. For example, the extracting unit 133 extracts a vector that is similar to the query information QE21 on the basis of the centroid information. For example, the extracting unit 133 extracts a vector from the second-index information storage unit 123 on the basis of the centroid information.

In the example of FIG. 7, the extracting unit 133 extracts the pieces of vector identification information V9, V12, V34, V54, V85, or the like, which are stored in the second-index information storage unit 123 in relation to the centroid (vector) identified with the centroid ID "V6".

The Providing Unit 134

The providing unit 134 provides various types of information. For example, the providing unit 134 provides various types of information to the terminal device 10 or the information providing device 50. For instance, the providing unit 134 provides the vector identification information that corresponds to the query as a search result. For example, the providing unit 134 provides the vector identification information selected by the extracting unit 133 to the information providing device 50. In the example of FIG. 7, the providing unit 134 provides the information providing device 50 with the vector identification information selected by the extracting unit 133 as the information that indicates the vector that corresponds to the query. In the example of FIG. 7, the providing unit 134 provides the information providing device 50 with the pieces of vector identification information V6, V9, V12, V34, V54, V85, or the like, as the information that indicates the vector that corresponds to the query.

In the example of FIG. 7, the providing unit 134 provides the information providing device 50 with the information for identifying the vector extracted by the extracting unit 133. For example, the providing unit 134 provides the information providing device 50 with 6 pieces of vector identification information, i.e., the pieces of vector identification information V6, V9, V12, V34, V54, and V85, which include the vector identification information V6 that is extracted as a centroid.

4. Flow of the Generation Process

Figure 6:
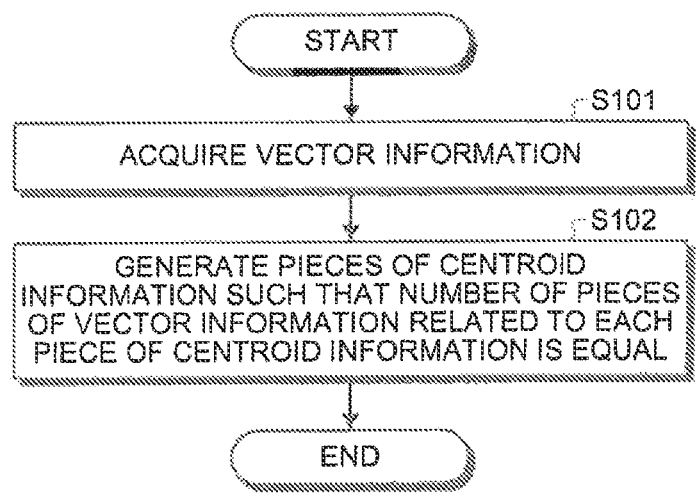
FIG. 6 is a flowchart that illustrates an example of the generation process according to the embodiment.

Next, by using FIG. 6, an explanation is given of the steps of the generation process performed by the generation system 1 according to the embodiment. FIG. 6 is a flowchart that illustrates an example of the generation process according to the embodiment.

As illustrated in FIG. 6, the generation device 100 acquires vector information (Step S101). In the example of FIG. 1, the generation device 100 acquires multiple pieces of vector information, such as the pieces of vector identification information V1 to V1100, as illustrated in the spatial information GR11, or the like.

Then, the generation device 100 generates multiple pieces of centroid information such that the number of pieces of vector information related to each piece of centroid information is equal (Step S102). For example, the generation device 100 generates multiple pieces of centroid information by conducting random sampling such that the number of pieces of vector information is equal. In the example of FIG. 1, the generation device 100 generates the pieces of centroid information in which the pieces of vector identification information V1, V2, V5, V6, V10, V11, V36, V79, V86, V95, and V111 are centroids, as illustrated in the spatial information GR12.

5. With Regard to Provision of Information

Next, by using FIG. 7, an explanation is given of provision of information by the generation system 1 according to the embodiment. FIG. 7 is a diagram that illustrates an example of provision of information that corresponds to a query according to the embodiment. The example of FIG. 7 illustrates a case where the information providing device 50 provides a search result to the terminal device 10 in accordance with a query acquired from the terminal device 10. Specifically, it illustrates a case where the information providing device 50 provides a user with the image information as a search result on the basis of the vector identification information acquired from the generation device 100. In the example of FIG. 7, an explanation is given of a case where the information providing device 50 provides image search service by using k-nearest proximity search. For example, during the k-nearest proximity search, k vectors are searched (extracted), starting from the one that has a shorter distance from a search query. Furthermore, for ease of explanation, in the case described below, "k" is "6".

First, the information providing device 50 acquires a query from the terminal device 10 that is used by the user U1 (Step S21). In the example of FIG. 7, the information providing device 50 acquires the query information QE21 from the terminal device 10. For example, the information providing device 50 acquires image information as the query information QE21 from the terminal device 10.

Then, the information providing device 50 transmits the query to the generation device 100 (Step S22). In the example of FIG. 7, the information providing device 50 transmits the query information QE21, acquired from the terminal device 10, to the generation device 100. Then, the generation device 100 acquires the image information as the query information QE21.

Then, the generation device 100 extracts a centroid by using the query information QE21 (Step S23). For example, the generation device 100 identifies and extracts the centroid that corresponds to the query information QE21 on the basis of the first index information stored in the first-index information storage unit 121.

For example, the generation device 100 uses various conventional technologies as appropriate to identify a feature area in the query information QE21 and calculate the feature value of the feature area as a local feature value. For example, the generation device 100 uses various conventional technologies as appropriate to extract a local feature value in the query information QE21.

Furthermore, for example, the generation device 100 generates the information related to the BoF from the query information QE21. Then, the generation device 100 searches for the BoF that is similar to the information related to the BoF in the query information QE21 on the basis of the first index information stored in the first-index information storage unit 121, thereby identifying a centroid.

For example, the generation device 100 searches for the BoF representation that is closest to the information related to the BoF in the query information QE21 by using the first index information stored in the first-index information storage unit 121. Furthermore, the generation device 100 may determine that there is no vector information that corresponds to the query information QE21 if the distance between the information related to the BoF in the query information QE21 and the information related to the BoF of the centroid, extracted during search, is equal to or more than a predetermined threshold. Furthermore, the generation device 100 may use various conventional technologies, such as the one disclosed in Non Patent Literature 2, to extract centroids. For example, the generation device 100 may conduct matching on feature point coordinates during the process disclosed in Non Patent Literature 2 so as to verify the degree of conviction in the similarity between the query information QE21 and the image that corresponds to the extracted centroid.

In the example of FIG. 7, the generation device 100 extracts the centroid information identified with the centroid ID "V6" from the centroid-information storage unit 122. For example, the generation device 100 extracts the centroid information identified with the centroid ID "V6" as the query information QE21 is closest to the centroid identified with the centroid ID "V6" among the centroids in the spatial information GR12.

Then, the generation device 100 extracts a vector on the basis of the centroid information (Step S24). For example, the generation device 100 extracts a vector that is similar to the query information QE21 on the basis of the centroid information. For example, the generation device 100 extracts a vector from the second-index information storage unit 123 on the basis of the centroid information.

In the example of FIG. 7, the generation device 100 extracts the pieces of vector identification information V9, V12, V34, V54, V85, or the like, stored in the second-index information storage unit 123 in relation to the centroid (vector) identified with the centroid ID "V6". Here, in FIG. 7, for ease of explanation, the 5 pieces of vector identification information V9, V12, V34, V54, and V85 are extracted.

Then, the generation device 100 provides the information providing device 50 with the information for identifying the extracted vector (Step S25). In the example of FIG. 7, the generation device 100 provides the information providing device 50 with 6 pieces of vector identification information, i.e., the pieces of vector identification information V6, V9, V12, V34, V54, and V85, which include the vector identification information V6 that is extracted as a centroid.

After receiving the information for identifying the vector from the generation device 100, the information providing device 50 provides the terminal device 10 with the image information related to the received information for identifying the vector (Step S26). For example, the information providing device 50 provides the terminal device 10 with the image information related to the information for identifying the vector, received from the generation device 100, as a search result that corresponds to the query information QE21. In the example of FIG. 7, after receiving the pieces of vector identification information V6, V9, V12, V34, V54, and V85 from the generation device 100, the information providing device 50 provides the terminal device 10 with the pieces of image information that correspond to the respective pieces of vector identification information V6, V9, V12, V34, V54, and V85. For example, the information providing device 50 may calculate the similarity measure between the query information QE21 and the piece of image information, which corresponds to each of the pieces of vector identification information V6, V9, V12, V34, V54, and V85, and provide the terminal device 10 with the pieces of image information that are arranged in order in accordance with the similarity measure.

6. With Regard to Generation of the Second Index

Figure 8:
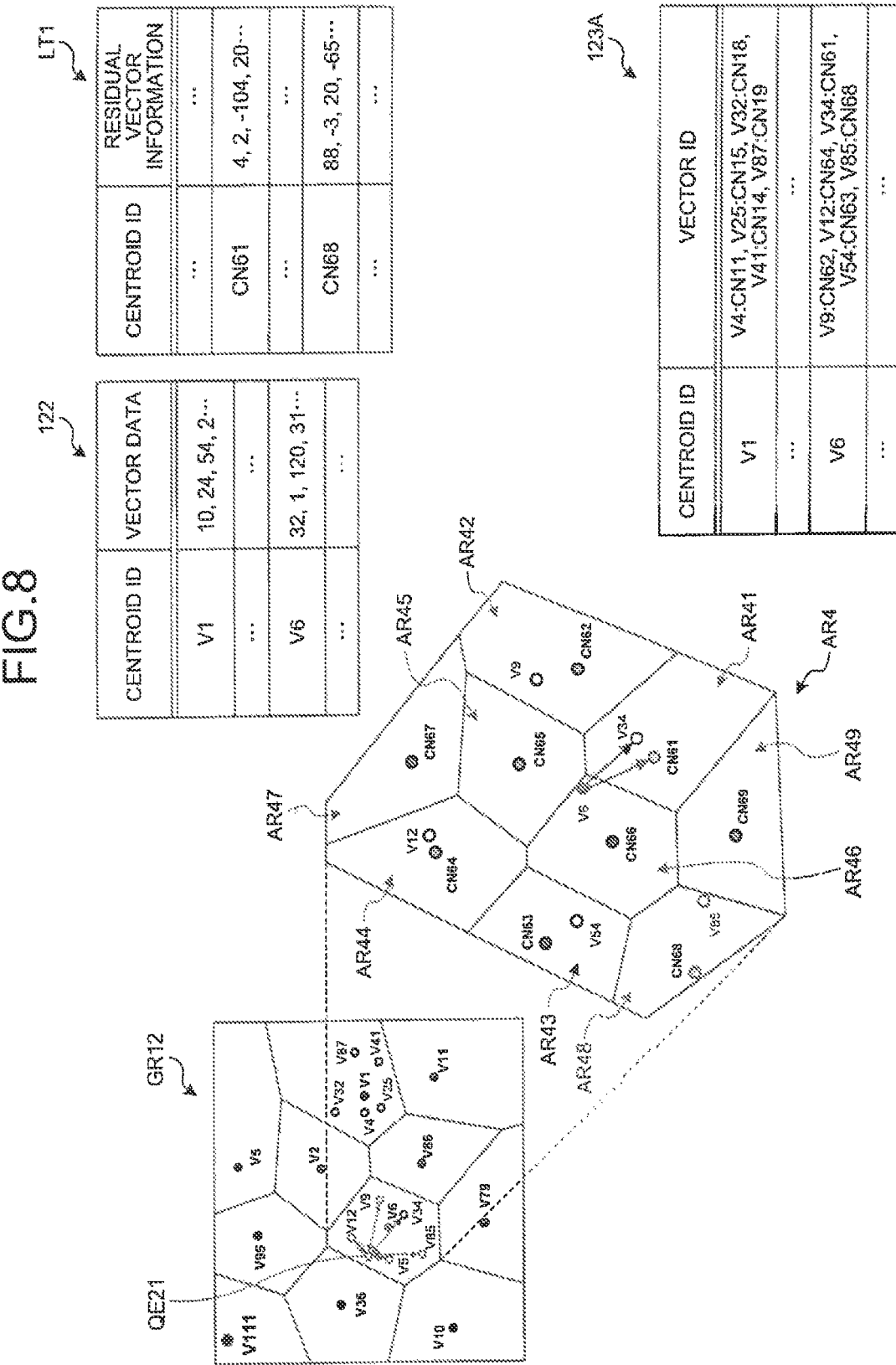
FIG. 8 is a diagram that illustrates an example of the process to generate the second index information according to the embodiment.

For ease of explanation, for example, the above-described example describes a case where the spatial information GR12 is divided into the areas AR1 to AR11; however, each of the areas AR1 to AR11 may be further divided into partial areas. This aspect is explained below by using FIG. 8. FIG. 8 is a diagram that illustrates an example of the process to generate the second index information according to the embodiment.

For example, the spatial information GR12 in FIG. 8 is equivalent to the spatial information GR12 in FIG. 7, and it illustrates the relationship between the query information QE21 and each of the vectors that correspond to the pieces of vector identification information V6, V9, V12, V34, V54, and V85, included in the area AR4. Thus, as illustrated in the spatial information GR12 of FIG. 8, although the distance between the query information QE21 and each of the vectors that correspond to the pieces of vector identification information V6, V9, V12, V34, V54, and V85 is different, the generation device 100 does not store the pieces of vector data that correspond to the pieces of vector identification information V9, V12, V34, V54, and V85. In this case, for example, it is considered that the distance between the query information QE21 and each vector is the distance between the query information QE21 and the vector that corresponds to the vector identification information V6, which is the centroid of the area AR4. In other words, the pieces of vector data that correspond to the pieces of vector identification information V9, V12, V34, V54, and V85 are quantized into the vector data that corresponds to the vector identification information V6. In this case, for example, it is assumed that the vectors included in each of the areas AR1 to AR11 have the same distance and therefore, if the number of vectors is increased, there is an increase in the sets of data that are matched as a search result.

Therefore, the generation device 100 may further divide each of the areas AR1 to AR11 into partial areas during the generation process. A case where the area AR4 is further divided into partial areas is described below. For example, on the basis of the residual vector information with regard to the vector information included in the area that corresponds to each piece of centroid information, the generation device 100 may generate pieces of partial centroid information that correspond to multiple partial areas, divided from the area. In the case described below, the generation device 100 generates the pieces of partial centroid information that correspond to partial areas, divided from the area, on the basis of the residual vector information that is generated from each piece of centroid information and the vector information included in the area that corresponds to the piece of centroid information.

For example, the generation device 100 may determine the number of partial spaces in accordance with the number of vectors included in the area AR4 or may determine the number of partial spaces in accordance with a predetermined setting value. In the case illustrated in FIG. 8, the generation device 100 divides the area AR4 into 9 partial areas AR41 to AR49. For example, the generation device 100 may determine the size of each of the partial areas AR41 to AR49 such that the number of vectors included in each of the areas AR41 to AR49 is equal. Furthermore, for example, the generation device 100 may determine the size of each of the partial areas AR41 to AR49 by using various conventional technologies related to clustering as appropriate.

In the example of FIG. 8, the generation device 100 calculates a residual vector from the centroid and the vector included in each of the partial areas AR41 to AR49 and generates the centroid of the partial area from the residual vector. In this case, there are no individual centroid sets even though there are multiple areas, and the common and single centroid set is formed. However, the generation device 100 may generate an individual centroid set for each of the areas. For example, if the total number of centroids is equal to or less than a predetermined threshold, the generation device 100 may generate an individual centroid set for each of the areas. Furthermore, the centroid of a partial area does not need to be a residual vector, but may be the original vector. For example, if the dispersion of the original vector is equal to or less than a predetermined threshold, the generation device 100 may set the original vector as the centroid of the partial area. For example, the generation device 100 generates a centroid CN61 on the basis of the vectors included in the partial area AR41, including the vector identified with the vector identification information V34. Furthermore, for example, the generation device 100 generates a centroid CN62 on the basis of the vectors included in the partial area AR42, including the vector identified with the vector identification information V9. Moreover, the generation device 100 may generate pieces of partial centroid information that correspond to partial areas, divided from the area, on the basis of the vector information included in the area that corresponds to each piece of centroid information.

For example, the generation device 100 stores the information about the residual vector between the centroid of one area and the centroid of each partial area. In the example of FIG. 8, as illustrated in partial centroid information LT1, the generation device 100 stores the information about the residual vector between the centroid V6 of the area AR4 and the centroid CN61 of the partial area AR41, the information about the residual vector between the centroid V6 of the area AR4 and a centroid CN68 of the partial area AR48, or the like. Furthermore, the generation device 100 may store the partial centroid information LT1 in the storage unit 120.

Furthermore, in relation to each vector, the generation device 100 may store the centroid information on the partial area to which the vector belongs. In the example of FIG. 8, as illustrated in a second-index information storage unit 123A, the generation device 100 may store the centroid CN62 in relation to the vector V9, which is stored in relation to the centroid V6. Furthermore, the generation device 100 may include the second-index information storage unit 123A in the storage unit 120. Specifically, the generation device 100 may store the centroid ID "CN62" in relation to the vector identification information "V9", which is related to the centroid ID "V6". In this way, the generation device 100 relates each vector to the information about the centroid of the partial area, to which the vector belongs, as stored in the second-index information storage unit 123A. Thus, the generation device 100 may determine which partial area a vector belongs by referring to the second-index information storage unit 123A, whereby the processing speed may be further increased.

Figure 9:
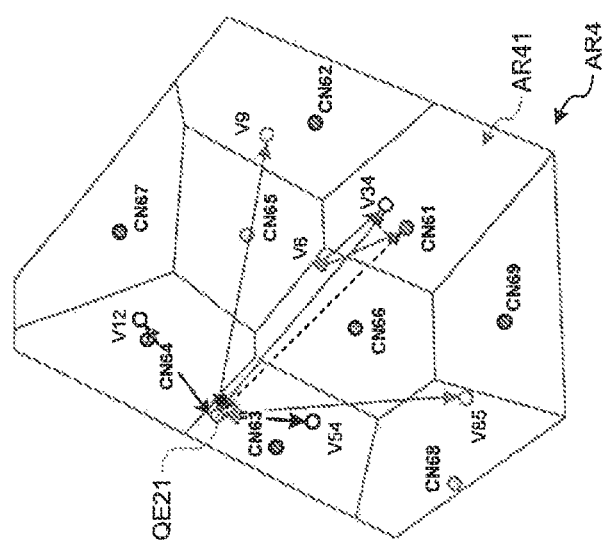
FIG. 9 is a diagram that illustrates an example of use of the second index information according to the embodiment.

As described above, if there is no division into the partial areas AR41 to AR49, it is considered that the distance between the query information QE21 and each vector is the distance between the query information QE21 and the vector that corresponds to the vector identification information V6, which is the centroid of the area AR4. Conversely, due to division into the partial areas AR41 to AR49, the generation device 100 may make more precise the distance between the query information QE21 and each vector. This aspect is explained by using FIG. 9. FIG. 9 is a diagram that illustrates an example of use of the second index information according to the embodiment.

For example, by using the partial centroid information LT1, the generation device 100 may quantize the position of each vector into the position of the centroid of the partial area to which the vector belongs. Thus, the generation device 100 may make the distance between the query information QE21 and each vector more precise to obtain the distance from the query information QE21 to vectors that correspond to the centroids of the partial areas AR41 to AR49, to which the respective vectors belong.

In the example of FIG. 9, the generation device 100 has the vector data on the vector identified with the centroid ID "V6" as illustrated in the centroid-information storage unit 122 and has the residual vector information with regard to the centroid CN61 as illustrated in the partial centroid information LT1. Therefore, for example, the generation device 100 may calculate the distance to the centroid CN61 with respect to the query information QE21. Thus, for example, with regard to the distance between the query information QE21 and the vector V34, the generation device 100 may obtain the distance to the centroid CN61, which is more approximated than the vector V6.

As described above, the generation device 100 uses the pieces of information about partial areas, which are further subdivided from each of the areas AR1 to AR11, whereby the amount of stored vector data may be reduced to the number of centroids that correspond to the areas, and each vector may be subdivided and quantized. For example, even if the number of vectors included in each of the areas AR1 to AR11 is enormous (e.g., ten thousand or one hundred thousand), the generation device 100 further subdivides the areas, thereby properly quantizing each vector. Therefore, the generation device 100 may generate the centroid information that enables efficient searching during the proximity search.

7. Example of Vector Division

Figure 10:
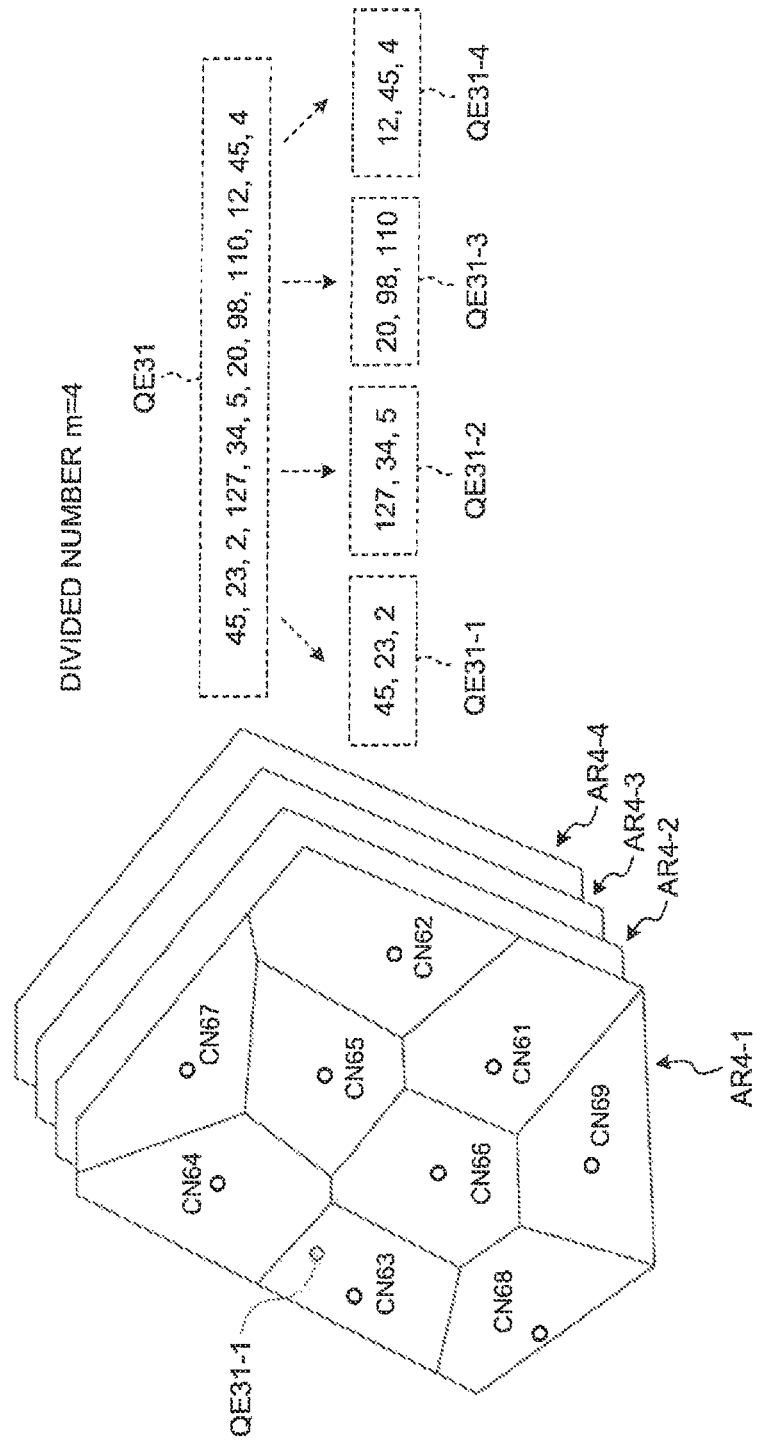
FIG. 10 is a diagram that illustrates an example of vector division according to the embodiment.

Furthermore, although the above-described example describes a case where the generation device 100 processes each vector as a single vector, the generation device 100 may divide each vector into partial vectors and process them. For example, the generation device 100 may perform processing by using the technology related to what is called product quantization. This aspect is explained by using FIG. 10. FIG. 10 is a diagram that illustrates an example of vector division according to the embodiment. Here, in the case illustrated in FIG. 10, for ease of explanation, the number of dimensions of vector data QE31 that corresponds to a query is 12; however, vectors in larger dimensions may be targeted for the generation device 100.

In the example of FIG. 10, the generation device 100 divides the vector data QE31 by 4. For example, out of the vector data QE31, the generation device 100 sets data in 1 to 3 dimensions as partial vector data QE31-1, data in 4 to 6 dimensions as partial vector data QE31-2, data in 7 to 9 dimensions as partial vector data QE31-3, and data in 10 to 12 dimensions as partial vector data QE31-4. Specifically, the generation device 100 sets "45, 23, 2" as the partial vector data QE31-1, "127, 34, 5" as the partial vector data QE31-2, "20, 98, 110" as the partial vector data QE31-3, and "12, 45, 4" as the partial vector data QE31-4.

Furthermore, although a case where a query is divided into partial vectors is described above, it is assumed that the vector that corresponds to each piece of image information is divided into partial vectors during the process to generate centroid information. Furthermore, for ease of explanation, FIG. 10 illustrates a case where the area AR4 in the spatial information GR12, illustrated in FIG. 1, is divided into partial areas (hereafter, sometimes referred to as "partial space"). The example illustrated in FIG. 10 describes a case where the area AR4 in the spatial information GR12 is divided into partial spaces AR4-1 to AR4-4.

The partial vector data QE31-1 is the vector data that corresponds to the partial space AR4-1, the partial vector data QE31-2 is the vector data that corresponds to the partial space AR4-2, the partial vector data QE31-3 is the vector data that corresponds to the partial space AR4-3, and the partial vector data QE31-4 is the vector data that corresponds to the partial space AR4-4. For example, in the example of FIG. 10, the partial vector data QE31-1 is located at the area of a centroid CN63 in the partial space AR4-1.

Although the partial spaces AR4-1 to AR4-4 are illustrated with similar shapes in the example of FIG. 10, each of the partial spaces AR4-1 to AR4-4 may have a different shape, or the manner of dividing areas in each of the partial spaces AR4-1 to AR4-4 may be different.

Then, the generation device 100 calculates the distance between each query and a centroid by, for example, adding the distances in all the partial spaces AR4-1 to AR4-4. For example, the generation device 100 may calculate the distance between each query and a vector according to the following Equation (1). Furthermore, the centroid of the partial area is basically common in the above-described example; however, in the case of partial vectors, the generation device 100 may generate a centroid set on a per vector basis. For example, the generation device 100 may generate a centroid set for each of the partial spaces AR4-1 to AR4-4. Thus, even if the tendency of distribution of vector data for each partial vector is different, the generation device 100 may generate the centroid information that enables efficient searching during the proximity search. Furthermore, the generation device 100 may generate a centroid set with a common partial vector. For example, the generation device 100 may generate a centroid set that is common to the partial spaces AR4-1 to AR4-4. Thus, even if a vector is divided into partial vectors, the generation device 100 may generate the centroid information that enables efficient searching during the proximity search.

$$\tilde{d}(x, y)^2 = \sum_j d(u_j(x - q_c(y)), q_{pj}(u_j(y - q_c(y))))^2 \quad (1)$$

Here, the value on the left side of the above-described Equation (1) represents, for example, the squared distance between a query and a vector. Furthermore, for example, "x" in the above-described Equation (1) corresponds to the query. Furthermore, for example, "y" in the above-described Equation (1) corresponds to the vector. Furthermore, for example, "$q_c(y)$" on the right side of the above-described Equation (1) represents the centroid of "y". For example, with regard to "y" in the above Equation (1), if there is no vector data on the vector, the generation device 100 may use the numerical value of the vector data on the centroid in the partial area to which each vector belongs, as in FIG. 8. Furthermore, for example, "$y-q_c(y)$" represents a residual vector. Moreover, for example, "$q_p$" on the right side of the above Equation (1) represents a predetermined quantizer (function).

Furthermore, for example, "j" on the right side of the above Equation (1) may be the number of divided spaces. For example, in the example of FIG. 10, "j" on the right side of the above Equation (1) may be the number "4" of divided spaces. Furthermore, for example, "$u_j( )$" on the right side of the above Equation (1) represents a partial residual vector between vectors in parentheses. For example, the generation device 100 may use the above-described Equation (1) to calculate the squared distance between a query and a vector in each partial space and combine them, thereby calculating the distance between each query and a vector. For example, in the example of FIG. 10, the generation device 100 calculates the squared distance between the pieces of partial vector data QE31-1 to QE31-4 in the partial spaces AR4-1 to AR4-4 and the vectors in the partial spaces AR4-1 to AR4-4 and combines them, thereby calculating the distance between the query, which corresponds to the vector data QE31, and the vector.

Thus, the generation device 100 may further subdivide and quantize each vector and may properly extract the vector that corresponds to a query. Furthermore, the generation device 100 may combine the above-described processes as appropriate to generate the centroid information that enables efficient searching during the proximity search. For example, the generation device 100 may directly use each partial vector during product quantization or may calculate a residual vector to use it. For example, the generation device 100 may calculate a residual vector from each partial vector and a centroid and use the residual vector. Furthermore, the generation device 100 may generate a centroid that is common to partial vectors or may generate a centroid for individual. For example, the generation device 100 may generate a centroid that is common to partial vectors, which are divided from a single vector, or may generate an individual centroid. Furthermore, the above descriptions are examples, and the generation device 100 may combine various types of information as appropriate or use them individually, thereby generating the centroid information that enables efficient searching during the proximity search. For example, the generation device 100 may use certain information in common or individually use certain information, thereby generating the centroid information that enables efficient searching during the proximity search.

8. Advantage

As described above, the generation device 100 according to the embodiment includes the acquiring unit 131 and the generating unit 132. The acquiring unit 131 acquires multiple pieces of vector information that correspond to each search target during the proximity search. The generating unit 132 generates multiple pieces of centroid information, in which each piece of vector information is related in accordance with a distance for vector quantization, based on multiple pieces of vector information acquired by the acquiring unit 131 such that a difference in the number of pieces of vector information related to each piece of centroid information falls within a predetermined value.

Thus, the generation device 100 according to the embodiment generates multiple pieces of centroid information, in which each piece of vector information is related in accordance with a distance for vector quantization, such that a difference in the number of pieces of vector information related to each piece of centroid information falls within a predetermined value. Thus, the generation device 100 may generate multiple centroids such that the number of vectors related to each centroid is equal and may generate the centroid information that enables efficient searching during the proximity search.

Furthermore, in the generation device 100 according to the embodiment, the generating unit 132 selects vector information as centroid information from multiple pieces of vector information in accordance with a predetermined condition, thereby generating multiple pieces of centroid information.

Thus, the generation device 100 according to the embodiment selects vector information as centroid information from multiple pieces of vector information in accordance with a predetermined condition and generates multiple pieces of centroid information so that it may generate the centroid information that enables efficient searching during the proximity search.

Furthermore, in the generation device 100 according to the embodiment, as the centroid information, the generating unit 132 selects the vector information, which is selected during random sampling, from multiple pieces of vector information, thereby generating multiple pieces of centroid information.

Thus, the generation device 100 according to the embodiment selects the vector information, which is selected during random sampling, as centroid information from multiple pieces of vector information to generate multiple pieces of centroid information so that it may generate the centroid information that enables efficient searching during the proximity search.

Furthermore, in the generation device 100 according to the embodiment, the acquiring unit 131 acquires multiple pieces of vector information at different timings. If the number of pieces of centroid information is less than a predetermined threshold when the acquiring unit 131 acquires vector information, the generating unit 132 selects the vector information as centroid information, thereby generating multiple pieces of centroid information.

Thus, if the number of pieces of centroid information is less than a predetermined threshold when vector information is acquired, the generation device 100 according to the embodiment selects the vector information as centroid information to generate multiple pieces of centroid information so that it may generate the centroid information that enables efficient searching during the proximity search.

Furthermore, in the generation device 100 according to the embodiment, the generating unit 132 generates the first index information, which is used to identify the centroid information, in response to a predetermined search request.

Thus, the generation device 100 according to the embodiment generates the first index information, which is used to identify multiple pieces of centroid information, in response to a predetermined search request so that it may generate the centroid information that enables efficient searching during the proximity search.

Furthermore, in the generation device 100 according to the embodiment, as the first index information, the generating unit 132 generates the search index for searching for high-dimensional vectors.

Thus, the generation device 100 according to the embodiment generates the search index for searching for high-dimensional vectors as the first index information so that it may generate the centroid information that enables efficient searching during the proximity search.

Furthermore, in the generation device 100 according to the embodiment, as the first index information, the generating unit 132 generates a tree structured index or a graph-structure type index with regard to multiple pieces of centroid information.

Thus, the generation device 100 according to the embodiment generates a tree structured index or a graph-structure type index as the first index information with regard to multiple pieces of centroid information so that it may generate the centroid information that enables efficient searching during the proximity search.

Furthermore, in the generation device 100 according to the embodiment, the generating unit 132 generates the second index information that indicates each piece of centroid information and the vector information related to the piece of centroid information.

Thus, the generation device 100 according to the embodiment generates the second index information that indicates each piece of centroid information and the vector information related to the piece of centroid information so that it may generate the centroid information that enables efficient searching during the proximity search.

Furthermore, in the generation device 100 according to the embodiment, as the second index information, the generating unit 132 generates an inverted index for identifying the vector information related to each piece of centroid information.

Thus, the generation device 100 according to the embodiment generates an inverted index for identifying the vector information related to each piece of centroid information as the second index information so that it may generate the centroid information that enables efficient searching during the proximity search.

Furthermore, in the generation device 100 according to the embodiment, the generating unit 132 generates multiple pieces of centroid information based on vector quantization for quantizing each partial vector, divided from each piece of vector information, such that the number of pieces of vector information related to each piece of centroid information is equal.

Thus, the generation device 100 according to the embodiment generates multiple pieces of centroid information based on vector quantization for quantizing each partial vector, divided from each piece of vector information, such that the number of pieces of vector information related to each piece of centroid information is equal so that it may generate the centroid information that enables efficient searching during the proximity search.

Furthermore, in the generation device 100 according to the embodiment, on the basis of the vector information included in the area that corresponds to each piece of centroid information, the generating unit 132 generates pieces of partial centroid information that correspond to multiple partial areas, which are divided from the area.

Thus, on the basis of the vector information included in the area that corresponds to each piece of centroid information, the generation device 100 according to the embodiment generates pieces of partial centroid information that correspond to multiple partial areas, which are divided from the area, so that it may generate the centroid information that enables efficient searching during the proximity search.

Furthermore, in the generation device 100 according to the embodiment, on the basis of the residual vector information with regard to the vector information included in the area that corresponds to each piece of centroid information, the generating unit 132 generates pieces of partial centroid information that correspond to multiple partial areas, which are divided from the area.

Thus, on the basis of the residual vector information with regard to the vector information included in the area that corresponds to each piece of centroid information, the generation device 100 according to the embodiment generates pieces of partial centroid information that correspond to multiple partial areas, which are divided from the area, so that it may generate the centroid information that enables efficient searching during the proximity search.

Furthermore, in the generation device 100 according to the embodiment, the generating unit 132 generates pieces of partial centroid information that correspond to multiple partial areas, divided from the area, on the basis of the residual vector information that is generated from each piece of centroid information and the vector information included in the area that corresponds to the piece of centroid information.

Thus, the generation device 100 according to the embodiment generates pieces of partial centroid information that correspond to multiple partial areas, divided from the area, on the basis of the residual vector information that is generated from each piece of centroid information and the vector information included in the area that corresponds to the piece of centroid information so that it may generate the centroid information that enables efficient searching during the proximity search.

Furthermore, in the generation device 100 according to the embodiment, the generating unit 132 generates the relation information in which the partial centroid information on each partial area is related to the vector information included in the partial area.

Thus, the generation device 100 according to the embodiment generates the relation information in which the partial centroid information on each partial area is related to the vector information included in the partial area so that it may generate the centroid information that enables efficient searching during the proximity search.

Furthermore, in the generation device 100 according to the embodiment, the generating unit 132 generates the relation information on the basis of the residual vector information that is generated from each piece of centroid information and each piece of partial centroid information that corresponds to each partial area with regard to the piece of centroid information.

Thus, the generation device 100 according to the embodiment generates the relation information on the basis of the residual vector information that is generated from each piece of centroid information and each piece of partial centroid information that corresponds to each partial area with regard to the piece of centroid information so that it may generate the centroid information that enables efficient searching during the proximity search.

9. Hardware Configuration

Figure 12:
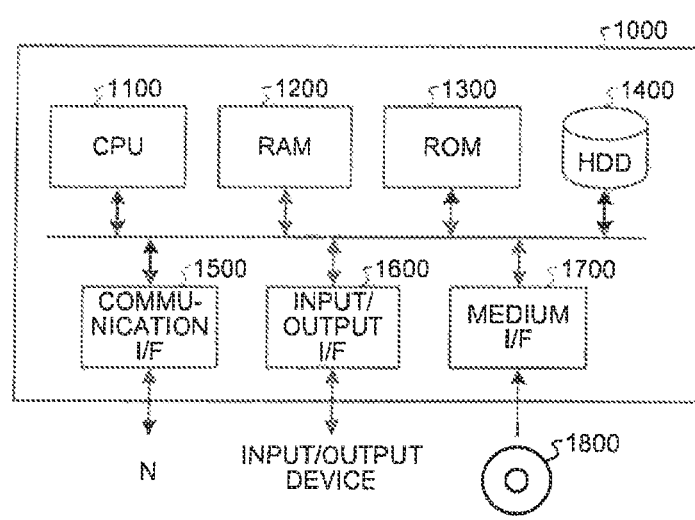
FIG. 12 is a hardware configuration diagram that illustrates an example of the computer that implements the function of the generation device.

The generation device 100 according to the above-described embodiment is implemented by using a computer 1000 that is configured as illustrated in FIG. 12 for example. FIG. 12 is a hardware configuration diagram that illustrates an example of the computer that implements the function of the generation device. The computer 1000 includes a CPU 1100, a RAM 1200, a read only memory (ROM) 1300, a hard disk drive (HDD) 1400, a communication interface (I/F) 1500, an input/output interface (I/F) 1600, and a medium interface (I/F) 1700.

The CPU 1100 operates in accordance with programs stored in the ROM 1300 or the HDD 1400 and controls each unit. The ROM 1300 stores boot programs, which are executed by the CPU 1100 when the computer 1000 is started up, programs that depend on hardware of the computer 1000, or the like.

The HDD 1400 stores programs executed by the CPU 1100, data used in the programs, and the like. The communication interface 1500 receives data from other devices via the network N and transmits it to the CPU 1100 or transmits the data generated by the CPU 1100 to other devices via the network N.

The CPU 1100 controls an output device, such as a display or a printer, and an input device, such as a keyboard or a mouse, via the input/output interface 1600. The CPU 1100 acquires data from the input device via the input/output interface 1600. Furthermore, the CPU 1100 outputs the generated data to the output device via the input/output interface 1600.

The medium interface 1700 reads programs or data stored in a recording medium 1800 and provides it to the CPU 1100 via the RAM 1200. The CPU 1100 loads the program from the recording medium 1800 to the RAM 1200 via the medium interface 1700 and executes the loaded program. The recording medium 1800 is, for example, an optical recording medium, such as a digital versatile disk (DVD) or a phase change rewritable disk (PD), a magneto-optical recording medium, such as a magneto-optical disk (MO), a tape medium, a magnetic recording medium, or a semiconductor memory.

For example, if the computer 1000 functions as the generation device 100 according to the embodiment, the CPU 1100 of the computer 1000 executes the program, loaded into the RAM 1200, thereby implementing the function of the control unit 130. The CPU 1100 of the computer 1000 reads these programs from the recording medium 1800 and executes them; however, according to another example, these programs may be acquired from other devices via the network N.

Heretofore, some embodiments of the subject application are explained in detail with reference to the drawings; however, they are examples, and the present invention may be implemented as other embodiments by making various modifications and improvements based on knowledges of persons skilled in the art as well as the aspects mentioned in the descriptions for disclosure of the invention.

10. Others

Furthermore, among the processes described in the above-described embodiments, all or some of the processes that are automatically performed as described may be performed manually, or all or some of the processes that are manually performed as described may be performed automatically by using a well-known method. Furthermore, the processing procedures, the specific names, and the information including various types of data and parameters described in the above specifications and the drawings may be arbitrarily changed except as otherwise noted. For example, various types of information illustrated in each drawing are not limited to the illustrated information.

Furthermore, the components of each device illustrated are functionally conceptual and do not necessarily need to be physically configured as illustrated in the drawings. Specifically, specific forms of separation and combination of each device are not limited to those depicted in the drawings, and a configuration may be such that all or some of them are functionally or physically separated or combined in an arbitrary unit depending on various types of loads, usage, or the like.

Furthermore, the processes described in the above-described embodiments may be combined as appropriate to the extent that there is no contradiction in the processing details.

Moreover, the terms "section", "module", and "unit" used in the above explanations may be read as "means", "circuit", or the like. For example, the acquiring unit may be read as an acquisition means or an acquisition circuit.

According to an aspect of embodiments, there is an advantage such that it is possible to generate the centroid information that enables efficient searching during the proximity search.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A generation device comprising:
    an acquiring unit that acquires multiple pieces of vector information that correspond to each search target during proximity search; and
    a generating unit configured to:
        perform random sampling of the multiple pieces of vector information at a predetermined number of times, and
        select vector information, during the random sampling, as centroid information from the pieces of vector information, the vector information being clustered with the smallest difference, wherein
        each piece of vector information is related in accordance with a distance for vector quantization, based on multiple pieces of vector information, acquired by the acquiring unit, such that a difference in a number of pieces of vector information related to each piece of centroid information falls within a predetermined value.

2. The generation device according to claim 1, wherein the generating unit selects vector information as centroid information from the pieces of vector information in accordance with a predetermined condition, thereby generating multiple pieces of centroid information.

3. The generation device according to claim 1, wherein the acquiring unit acquires the pieces of vector information at different timings, and
    if a number of pieces of centroid information is less than a predetermined threshold when the acquiring unit acquires vector information, the generating unit selects the vector information as centroid information, thereby generating multiple pieces of centroid information.

4. The generation device according to claim 1, wherein the generating unit generates first index information, which is used to identify centroid information, in response to a predetermined search request.

5. The generation device according to claim 4, wherein the generating unit generates a search index for searching for a high-dimensional vector as the first index information.

6. The generation device according to claim 4, wherein the generating unit generates a tree structured index or a graph-structure type index with regard to multiple pieces of centroid information as the first index information.

7. The generation device according to claim 1, wherein the generating unit generates second index information that indicates each piece of centroid information and vector information related to the piece of centroid information.

8. The generation device according to claim 7, wherein the generating unit generates an inverted index for identifying vector information related to each piece of centroid information as the second index information.

9. The generation device according to claim 1, wherein the generating unit generates multiple pieces of centroid information based on vector quantization for quantizing each partial vector, divided from each piece of vector information, such that a difference in a number of pieces of vector information related to each piece of centroid information falls within a predetermined value.

10. The generation device according to claim 1, wherein based on vector information included in an area that corresponds to each piece of centroid information, the generating unit generates pieces of partial centroid information that correspond to multiple partial areas, which are divided from the area.

11. The generation device according to claim 1, wherein based on residual vector information with regard to vector information included in an area that corresponds to each piece of centroid information, the generating unit generates pieces of partial centroid information that correspond to multiple partial areas, which are divided from the area.

12. The generation device according to claim 1, wherein the generating unit generates pieces of partial centroid information that correspond to multiple partial areas, divided from the area, based on residual vector information that is generated from each piece of centroid information and vector information included in an area that corresponds to the piece of centroid information.

13. The generation device according to claim 10, wherein the generating unit generates relation information in which partial centroid information on each partial area is related to vector information included in the partial area.

14. The generation device according to claim 13, wherein the generating unit generates the relation information based on residual vector information that is generated from each piece of centroid information and each piece of partial centroid information that corresponds to each partial area with regard to the piece of centroid information.

15. A generation method implemented by a computer comprising:
    an acquiring step of acquiring multiple pieces of vector information that correspond to each search target during proximity search; and
    a generating step of:
        performing random sampling of the multiple pieces of vector information at a predetermined number of times, and
        selecting vector information, during the random sampling, as centroid information from the pieces of vector information, the vector information being clustered with the smallest difference, wherein
    each piece of vector information is related in accordance with a distance for vector quantization, based on multiple pieces of vector information, acquired at the acquiring step, such that a difference in a number of pieces of vector information related to each piece of centroid information falls within a predetermined value.

16. A non-transitory computer-readable recording medium having stored therein a generation program that causes a computer to execute a process comprising:
    an acquiring step of acquiring multiple pieces of vector information that correspond to each search target during proximity search; and
    a generating step of:
        performing random sampling of the multiple pieces of vector information at a predetermined number of times, and
        selecting vector information, during the random sampling, as centroid information from the pieces of vector information, the vector information being clustered with the smallest difference, wherein
    each piece of vector information is related in accordance with a distance for vector quantization, based on multiple pieces of vector information, acquired at the acquiring step, such that a difference in a number of pieces of vector information related to each piece of centroid information falls within a predetermined value.

* * * * *